United States Patent
Choi

Patent Number: 5,928,396
Date of Patent: Jul. 27, 1999

[54] POCKET FILTER AND METHOD AND APPARATUS FOR MAKING THE SAME

[75] Inventor: Kyung-Ju Choi, Jefferson County, Ky.

[73] Assignee: AAF International, Louisville, Ky.

[21] Appl. No.: 09/001,074

[22] Filed: Dec. 31, 1997

[51] Int. Cl.$^6$ .......................... B01D 46/02; B01D 39/16
[52] U.S. Cl. ................. 55/379; 55/381; 55/492; 55/497; 55/528; 55/DIG. 5; 55/DIG. 12; 210/487
[58] Field of Search ............... 55/341.1, 341.2, 55/341.6, 378–381, 492, 497–499, 514, 527, 528, DIG. 5, DIG. 12; 210/486, 487

[56] References Cited

U.S. PATENT DOCUMENTS

| | | | |
|---|---|---|---|
| 1,773,134 | 8/1930 | Fisher | 210/486 X |
| 3,280,985 | 10/1966 | Czerwonka | 55/499 X |
| 3,486,627 | 12/1969 | Ashby et al. | 210/486 |
| 4,056,375 | 11/1977 | Ringel et al. | 55/381 |
| 4,154,587 | 5/1979 | Gerok | 55/DIG. 5 |
| 4,261,713 | 4/1981 | Bourdois et al. | 55/381 X |
| 4,356,011 | 10/1982 | Day et al. | 55/368 |
| 4,537,812 | 8/1985 | Elbers | 55/497 X |
| 4,959,045 | 9/1990 | Hartley et al. | 210/486 X |
| 5,066,319 | 11/1991 | Lippold | 55/528 X |
| 5,215,069 | 6/1993 | Sanders | 156/70 |
| 5,230,455 | 7/1993 | Price | 55/DIG. 5 |
| 5,246,474 | 9/1993 | Greatorex | 55/DIG. 5 |
| 5,414,915 | 5/1995 | Pryne | 55/381 X |
| 5,505,852 | 4/1996 | van Rossen | 55/514 X |
| 5,554,203 | 9/1996 | Borkent et al. | 55/499 X |
| 5,695,535 | 12/1997 | Hintenlang et al. | 55/DIG. 12 |

*Primary Examiner*—Robert H. Spitzer
*Attorney, Agent, or Firm*—Polster, Lieder, Woodruff & Lucchesi

[57] ABSTRACT

A filter bag assembly and method and machinery to form the same wherein spaced opposed filter bag panels are connected together by transversely extending preselectively sized binder strips fastened selectively at opposed ends to the spaced filter panels to restrain outward inflation of the filter bag.

24 Claims, 5 Drawing Sheets

POCKET FILTER AND METHOD AND APPARATUS FOR MAKING THE SAME

BACKGROUND OF THE INVENTION

The present invention relates to a unique and novel pocket filter arrangement and a method and apparatus for making the same and, more particularly, to a pocket filter arrangement, method and apparatus for pocket shaping and restricting pocket inflation with a minimum of interference to a fluid stream to be filtered by the unique pocket filter.

Pocket filter assemblies are generally well known in the fluid filtration art. Past assembly arrangements include one or more filter cartridges or filter bags that are secured across dirty fluid streams to be treated so that particulate materials are separated from such fluid streams as they flow through the filter media of the filter bags, the bags being replaced by fresh bags whenever necessary.

In such filter arrangements, it has proven desirable to minimize interfering contact between adjacent bags, to enhance fluid flow through the filter arrangements so as to effectively utilize a maximum of fluid filtering area with a minimum of fluid flow pressure loss and with a concomitant reduction of required operating energy. In U.S. Pat. No. 4,056,375, issued to W. Ringel et al on Nov. 1, 1977, wedge-shaped, stiffened filter pockets, incorporating laminar spacing elements secured to the wedge faces of the pockets by fusion, have been utilized to separate dust particles from an air stream. The laminar spacing elements have been comparatively difficult to manufacture and assemble and have tended to interfere with air stream flow through the filtering area, limiting full use of the filtering area, with the methods of manufacture and machinery utilized being comparatively complex and unsuitable for maximizing filtration efficiency. In U.S. Pat. No. 4,356,011, issued to C. E. Day et al on Oct. 26, 1982, the filter bags disclosed include a plurality of alternating rows of filamentary stays or span stitching spaced across the filter bag width to shape the bag into a plurality of communicating tube-like sections. Such an arrangement and like arrangements also have been comparatively complex and expensive in manufacture, maintenance and operation and have tended to limit maximum usage of filtering area and also have tended to interfere with uniform fluid flow through the filtering area for the treated fluid streams. In U.S. Pat. No. 5,215,609, issued to S. L. Sanders on Jun. 1, 1993, a comparatively complex and expensive ultrasonic welding method for forming and manufacturing bag filters is disclosed with no particular consideration being given to adjacent filter bag interference and the inflation limitation of each of the filter bags.

The present invention provides a unique and novel filter bag manufacturing apparatus and method which is straightforward, economical and efficient in manufacture, assembly and maintenance, requiring a minimum of parts and a minimum of operating steps to produce a unique and novel filter bag arrangement which can efficiently and effectively filter particulate matter from a particulate laden fluid stream to be treated with a minimum of pressure drop and, thusly, with reduced energy requirements. Various other features of the present invention will become obvious to one skilled in the art upon reading the disclosure set forth herein.

BRIEF SUMMARY OF THE INVENTION

More particularly, the present invention provides a fluid filter assembly for removing particulate contaminants from a contaminant laden fluid stream comprising: a sheath-like filter bag including a pair of longitudinally extending fluid pervious filter panels positioned in opposed relation to form filter bag sides therebetween, the filter bag formed with the opposed filter panels including an open upstream end and a spaced downstream end, the opposed longitudinally extending fluid pervious filter panels being connected together by binder means in strip-like form with a body portion arranged to extend transversely between the longitudinally extending opposed filter panels and fastened on opposite ends of the body portion to the opposed panels, the strip-like form body portion being of preselective transverse breadth between opposed filter panels serving to shape and restrain outward inflation of the sheath-like filter bag with minimal interference with a fluid stream passing through the filter panels of the filter bag. In addition, the present invention provides a method of forming a fluid filter assembly comprising: continuously feeding preselectively sized sheets of filter media from a media supply zone; guiding the sheets of filter media in spaced opposed filter panel filter bag forming relation to a fastening zone; continuously feeding at least one preselectively sized strip-like fastening member between the spaced opposed filter; fastening the strip-like fastening member to the opposed filter panels to provide at least one transversely extendible body portion therebetween to limit inflation of the filter bag formed by the filter panels; and sealing at least the side edges of spaced opposed filter panels. Finally, the present invention provides a filter bag forming machine comprising: filter medium support and guide means positioned to feed and guide filter medium from a supply source in filter bag forming spaced opposed filter panels to a fastening means; a tape support means positioned to feed filter fastening tape between opposed inner faces of the filter panels to the fastening means, the fastening means including cooperative anvil and anvil striker means one of which anvil and striker means is positionable intermediate the opposed inner faces and the other of which is cooperatively positionable along the outer faces of the filter panels wherein the anvil and anvil striker means can cooperatively fasten the tape at preselective locations to the opposed inner faces of the spaced filter panels with a body portion extending therebetween to restrain outward inflation of a formed sheath-like filter bag which includes the opposed filter panels.

It is to be understood that various changes can be made by one skilled in the art in one or more of the several parts of the above-described filter assembly and filter bag forming machine and in one or more of the several steps of the above method of forming a fluid filter assembly without departing from the scope or spirit of the present invention.

BRIEF DESCRIPTION OF THE DRAWINGS

Referring to the drawings which disclose one advantageous embodiment of the inventive filter bag arrangement and modifications thereto, the inventive filter bag assembly machine therefore and the inventive method of forming the inventive filter bag.

DETAILED DESCRIPTION OF THE DRAWINGS

Figure 1:
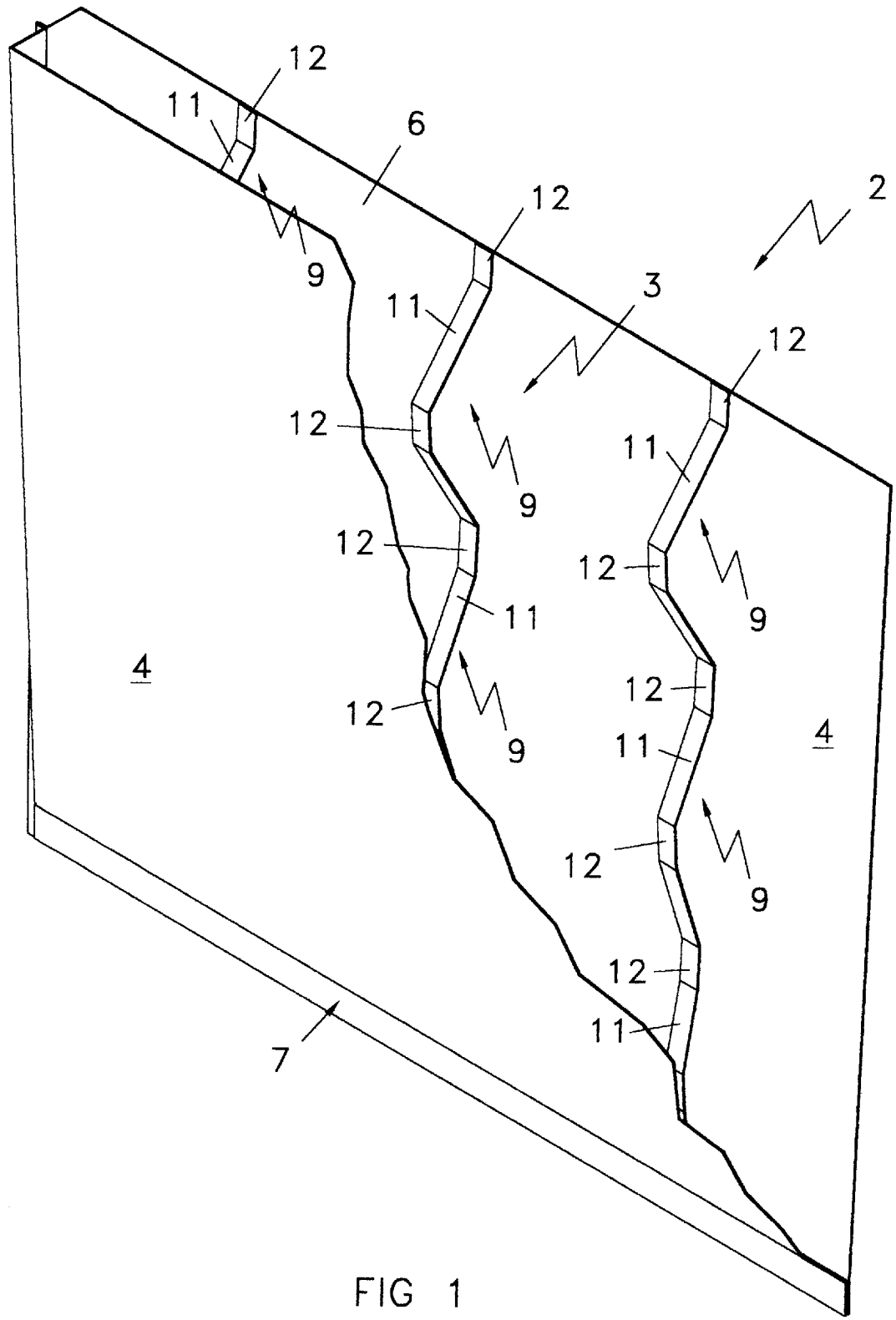
FIG. 1 is a partially broken away, isometric view of the inventive filter bag assembly.

Referring to FIGS. 1–4 of the drawings, the inventive filter assembly 2 for removing particulate contaminants from a contaminant laden fluid stream, such as a dirty air or other gas stream or even a contaminated liquid when an appropriate filter medium is employed, is disclosed as including a sheath-like filter bag 3, the geometric shape of which is generally known in the art. In this regard, the bag can generally have a depth or longitudinal extension in the range of two (2) inches to forty (40) inches and can be formed in a single or multiple layer form from any one of a number of suitable filter materials such as spun or chopped fiberglass or any of a number of known synthetic materials utilized for filtering purposes. The filter bag 3 includes a pair of longitudinally extending fluid pervious filter panels 4 positioned in opposed relation to form the filter bag sides 3 to include an open upstream end 6 and a spaced downstream end 7. In one advantageous embodiment of the invention, the transversely extending downstream end edges of facing filter panels 4, like the longitudinally extending side edges of filter panels 4 can be sealed closed. However, it is to be understood that in certain select embodiments it would be possible to leave the transversely extending downstream end edges open a preselected amount.

In accordance with one feature of the present invention, the opposed fluid pervious filter panels 4 can be connected together by spaced parallel rows of strip-like binders 9 (FIG. 1) which can be in the form of separately spaced segments, spaced transversely and longitudinally (FIG. 1) or in the form of transversely spaced longitudinally extending continuous tapes 9, as shown in the drawings, separate segments and longitudinally extending continuous tapes 9 both can be arranged to include body portions 11 and opposite end portions 12. The individual segments of strip-like binders and the spaced continuous tapes 9 can be formed from a suitably strong flexible or substantially rigid filter material of advantageously narrow breadth to present limited interference with accompanying pressure drop to the fluid stream to be treated. Advantageously, the spaced, strip-like binder segments and the continuous tapes 9 can be of fusible material with body portions 11 extending between filter panels 4 and with opposite end portions 12 joined by fusion to the opposite facing filter panels 4. When longitudinally extending continuous tapes 9 (FIGS. 2 and 3) are utilized to shape and form filter bags 3, they can be arranged in spaced parallel rows to include spaced body portions 11 and panel fastened end portions 12 intermittently fastened to opposite filter panels 4 in successively linear offset relation with corresponding body portion 11 of each spaced longitudinally extending tape 9 being in agreement in size and geometry and with body portions 11 of spaced adjacent tapes 9 decreasing successively in transverse breadth between opposed filter panels 4 from the upstream end 6 of filter bag 3 toward downstream end 7 of filter bag 3, whereby the opposed filter panels of sheath-like filter bag 3 forms a filter bag. The so formed filter bag 3 includes an overall inwardly tapering shape when inflated by a fluid stream with fastened, decreasing in length body portions 11 limiting or restraining the amount of filter bag inflation without substantially restricting fluid flow of the stream to be treated. It is to be understood that continuous strip-like binders 9 can be longitudinally and transversely spaced in a similar tapered bag form and that fastening opposed ends 12 of body members 11 to opposed filter panels can be accomplished in a number of fastening ways other than by fusion. Also, as above noted, the side edges and the downstream edges of filter panels 4 can be electively joined and closed by fusion or by some other suitable edge joining structure. Further, not only can the fluid pervious filter panels forming filter bags 3 longitudinally extend in a range of approximately two (2) inches to forty (40) inches and in width in a range of approximately six (6) inches to thirty-six (36) inches with body portions transversely extending in a range of approximately six (6) inches to thirty-six (36) inches but the strip-like body portions 11 advantageously can be fusible filtering material advantageously of a thickness in the range of zero point zero zero five (0.005) inches to zero point zero eight (0.08) inches and of a transverse breadth in the range of zero point zero five (0.05) inches to zero point five (0.5) inches.

Figure 2:
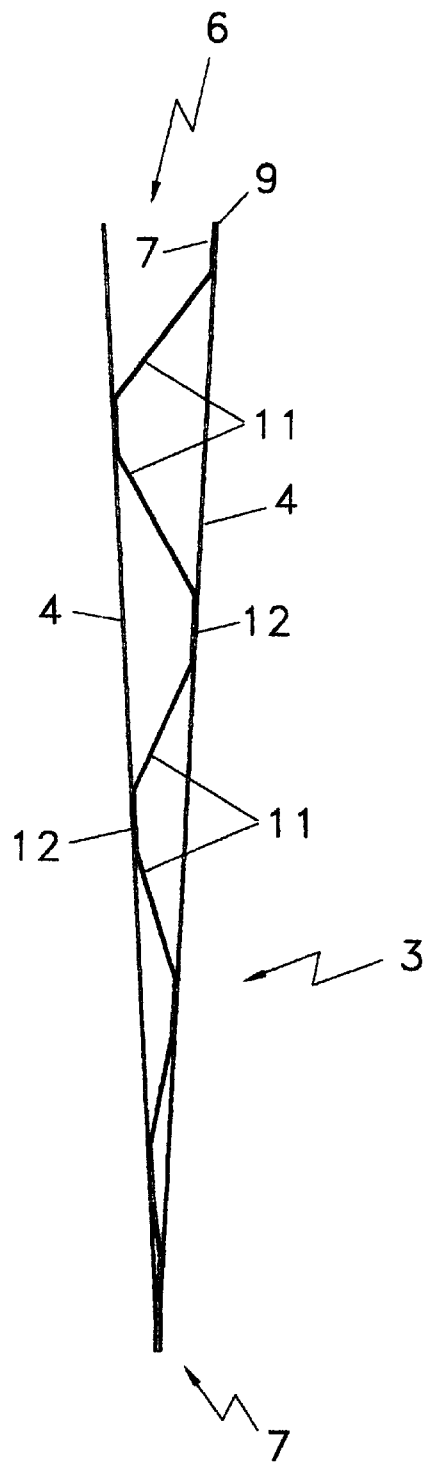
FIG. 2 is a reduced cross-sectional view of a filter bag assembly similar to that of FIG. 1.
Figure 3:
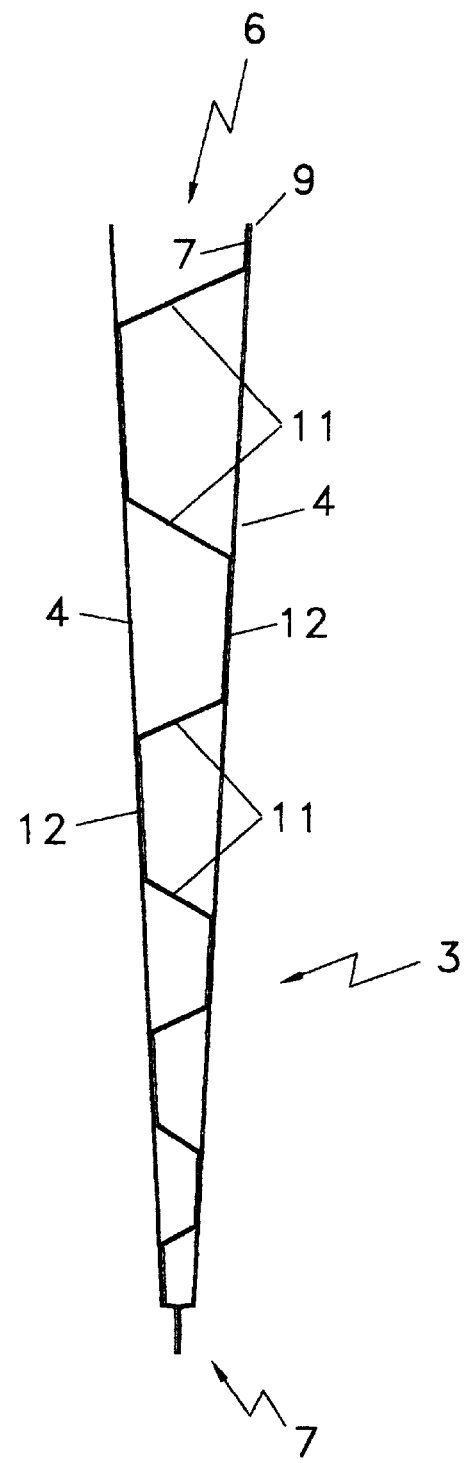
FIG. 3 is a reduced cross-sectional view of a modified filter bag assembly similar to the view of FIG. 2.

Referring to FIGS. 2 and 3 of the drawings, it can be seen that when a continuous tape 9 is utilized with a filter bag 3 to form strip-like binders with body portions 11 and opposite end portions 12, different geometries can be utilized in fastening opposite filter panels 4. For example, in FIG. 2, a continuous fastening tape 9 is disclosed with comparatively longer decreasing body portions 11 and comparatively decreasing shorter end portions from upstream toward downstream ends of filter bag 3. In FIG. 3, a continuous fastening tape 9 is disclosed with comparatively shorter decreasing body portions 11 and comparatively decreasing longer end portions from upstream end 6 toward downstream end 7 of filter bag 3. It is to be understood that the body and end portions 11 and 12 of continuous tapes 9 can be varied by one skilled in the art as desired and, in the embodiments of FIGS. 2 and 3, the disclosed arrangements both provide for filter bags 3 which taper inwardly from upstream end 6 of filter bag 3 toward the downstream end 7 with the bag sides and downstream edges being sealed closed with all sealing advantageously being accomplished by fusion.

Figure 4:
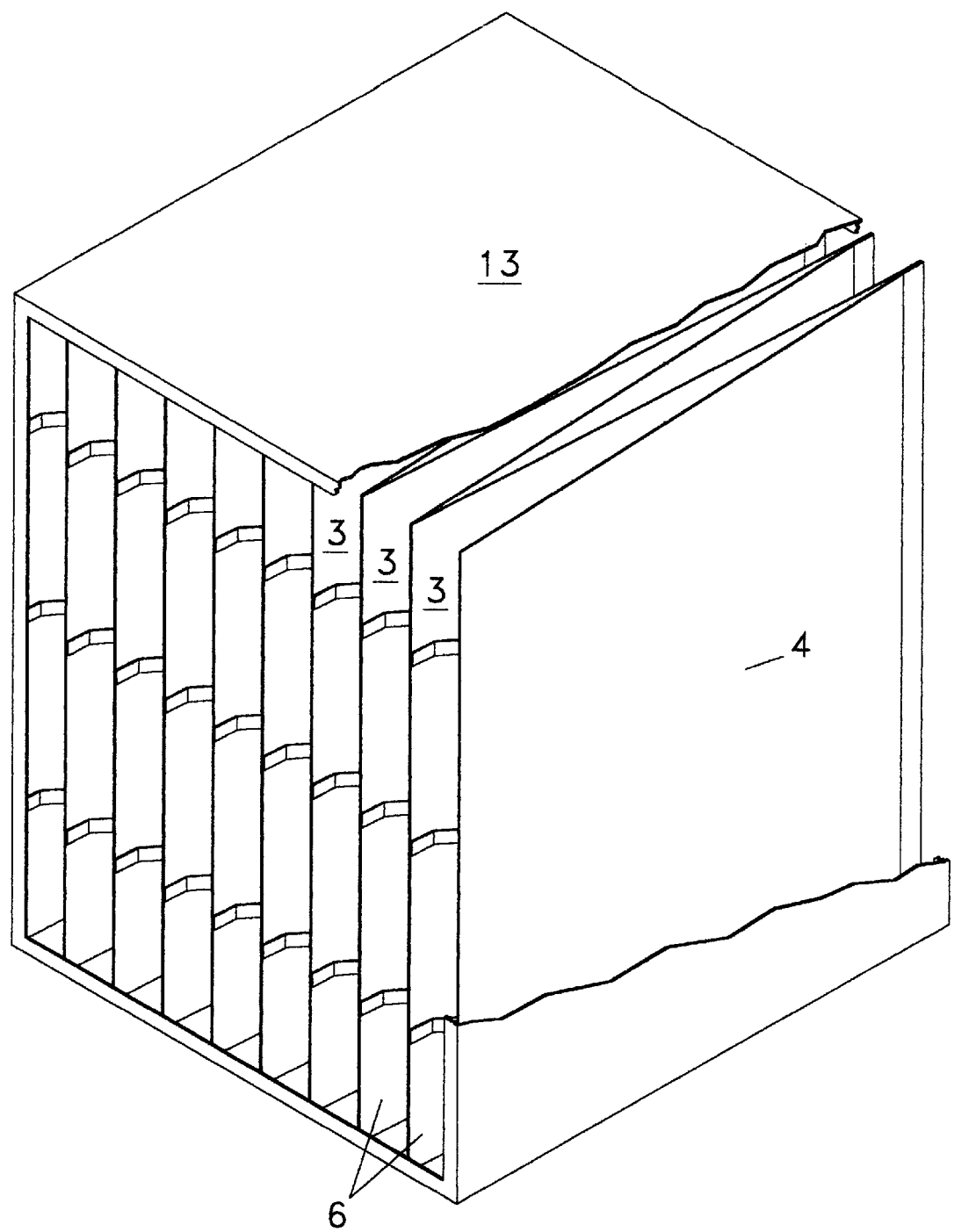
FIG. 4 is a partially broken away, isometric view of several inventive filter bag assemblies like that of FIG. 1 installed in a flow-through housing structure.

Referring to FIG. 4 of the drawings, assembled tapered filter bags 3, as above described, are shown disposed in a flow-through housing 13 of a suitably selected rigid material such as metal or plastic with the mouths or upstream ends 6 of filter bags 3 being fastened in a suitable fashion to each other and/or to spaced parallel header strips extending along the upstream end of flow-through housing 13.

Figure 5:
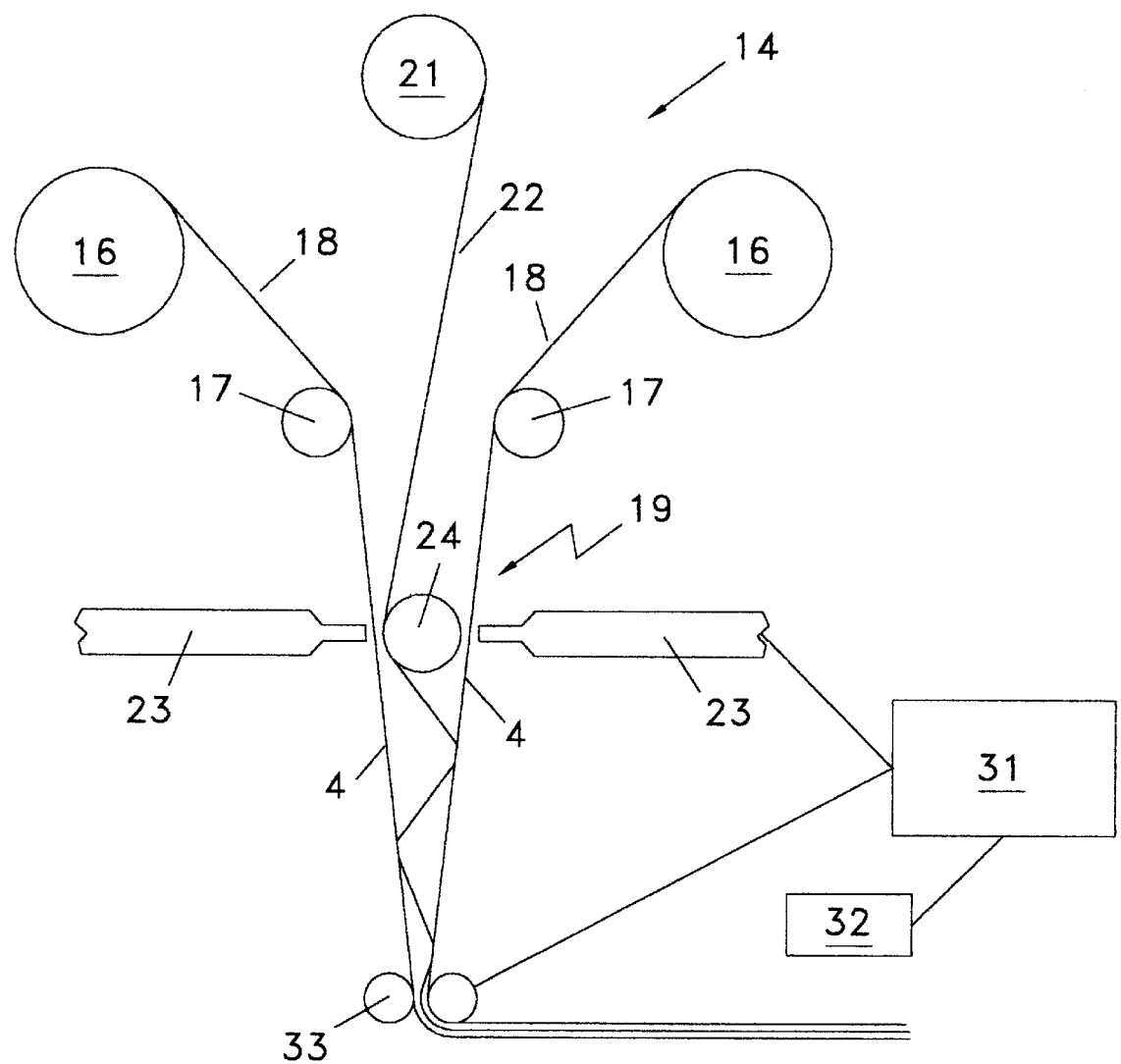
FIG. 5 is a schematic arrangement of the inventive filter bag forming machine and the inventive method of forming such a filter bag assembly as is disclosed in FIGS. 1–4; and, FIGS. 6–10 are enlarged schematic views disclosing a portion of the inventive forming machine and method of FIG. 5 with the anvil progressively pivoting or rocking from one filter bag face sealing position of a tape to the opposite filter bag face sealing position of the tape so as to progressively fasten the tape to opposed inner bag faces of a filter bag.
Figure 6:
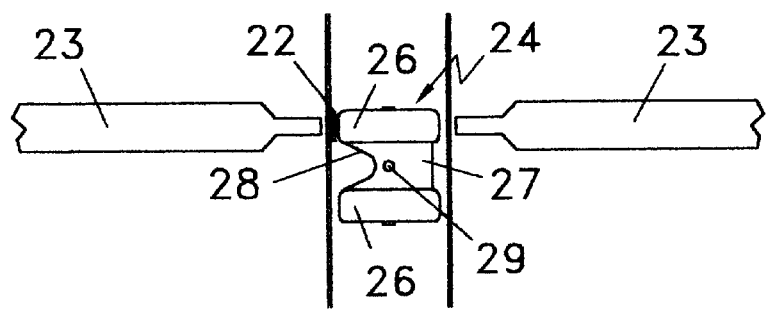
Figure 7:
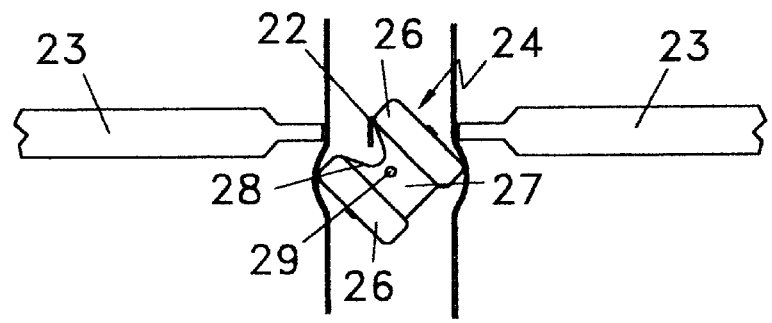
Figure 8:
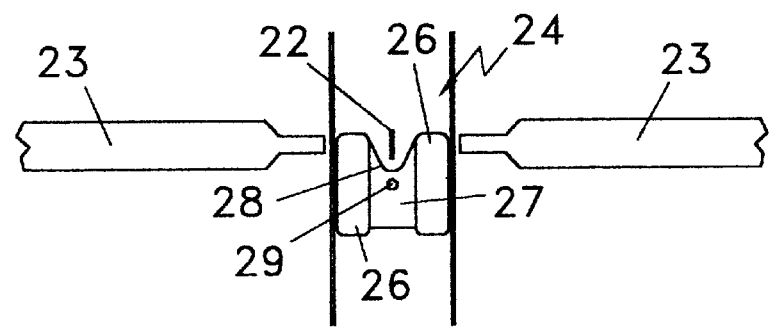
Figure 9:
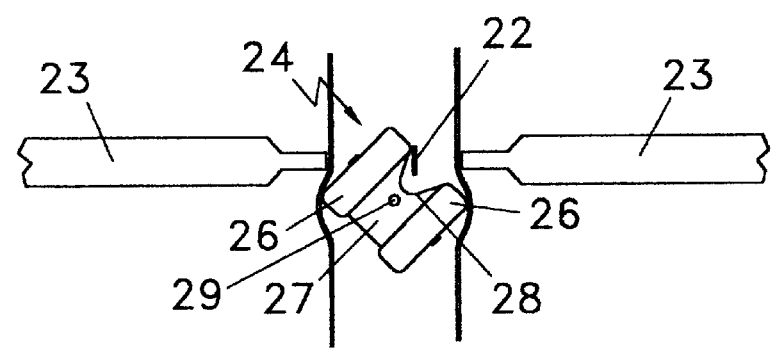
Figure 10:
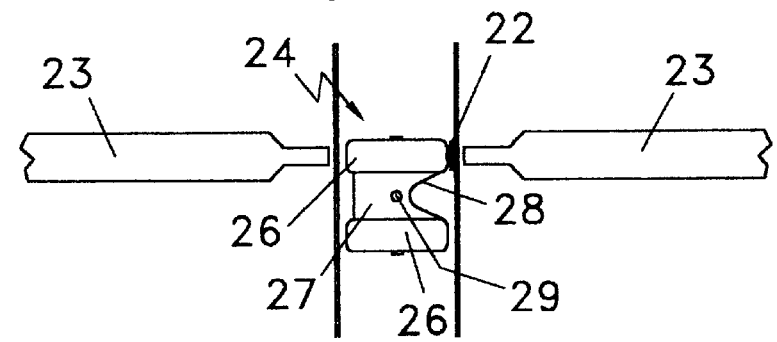

Referring to FIG. 5 of the drawings, an inventive apparatus and method of forming the above-described filter bags 3 is schematically disclosed. The inventive filter bag forming machine 14 (FIG. 5) includes a spaced pair of filter medium rotatable support rollers 16 and a spaced pair of rotatable guide rollers 17 so positioned with respect to each other as to continuously feed and guide sheets of filter medium 18 to form spaced opposed filter bag forming panels 4 at an inventive filter panel and filter bag forming apparatus 19. A binder tape support roller 21 is positioned between the spaced filter medium support rollers 16 and spaced guide rollers 17 to continuously feed a fastening tape 22 advantageously of fusible material, to the filter panel and filter bag forming apparatus 19. Fastening apparatus, in the advantageous embodiment disclosed includes a pair of laterally movable sonic anvil strikers 23 positioned in a spaced, facing or opposed direction adjacent the outer faces of the spaced opposed filter bag forming filter panels 4. A rockable and pivotable anvil 24 is positioned intermediate the inner faces of the spaced opposed filter bag forming panels 4 to be in alignment with the spaced sonic and movable anvil strikers 23. With this arrangement, the spaced opposed and laterally movable sonic anvil strikers 23 in cooperation with rockable and pivotable anvil 24 serve to fuse the fastening tape 22 successively and alternatively to opposed facing filter panels 4.

Referring particularly to FIGS. 6 through 10 of the drawings, it can be seen that anvil 24 includes two spaced anvil surfaces, which advantageously can be in the form of freely rotating cylinders 26 positioned to rotate with anvil 24 about the intermediate anvil body 27. As can be seen in FIGS. 6 through 10 of the drawings, anvil body 27 includes a tape cam follower surface 28 which extends between the spaced anvil providing cylinders 26 mounted on opposite sides of anvil body 27. Anvil body 27 is rockable and pivotable about pivot pin 29 on which it is mounted so that one of the two cylindrical surfaces 26 can be utilized as a selected anvil surface when pivot 29 is appropriately pivoted or rocked to the appropriate anvil surface. To pivot or rock the pin 29 and to feed the tape 22 along the anvil surfaces 26, of anvil 24, appropriate computer-controlled drive machinery can be utilized, this being schematically disclosed in FIG. 5 by the control box 31. Box 31 also serves to control a cut-off mechanism, such as a laser knife, illustrated schematically by filter bag 3 cut-off box 32 (also FIG. 5). In addition, control box 31 controls the drive for pinch rollers pair 33, the lateral movement for anvil strikers 23, and the sonic mechanism associated with the strikers 23. It is to be understood that control box 31 incorporates an appropriate computer control program with appropriate linkages to the anvil strikers 23, and the sonic emission therefore, the laser box 32 and the pinch rollers 33.

In carrying out the inventive method (FIG. 5), sheets of fusible media 22 are fed by pinch rollers 33 from spaced supply zones 16 in spaced opposed filter panel filter bag forming relation to filter bag forming apparatus 19. At substantially the same time a plurality of preselectively spaced tapes 22 of fusible filter material are fed from tape supply 21 by pinch rollers 33 between the spaced opposed filter panels to the bag forming and fastening zone 19. The tapes are sonically fused to the opposed filter panels in longitudinally extending relation with each adjacently spaced tape being fused to opposed filter panels in successively offset and alternatively staggered relation, the adjacent tapes being preselectively of corresponding and successively decreasing transverse breadth from the upstream toward the downstream end of the opposed filter bag forming filter panels. The so-taped and fused panels are then sonically fuse sealed along the opposed side edges and the downstream edge of the bag, if so elected. Then, the completed filter bag is severed from the continuously fed sheets and fastener zone by suitable bag separator or cut-off mechanism.

From the above, it can be seen that a unique filter bag arrangement, filter bag forming machine and method of forming is herein provided which is straightforward, economical and efficient in manufacture and assembly requiring a minimum of parts in both product and machinery and a minimum of assembly to produce filter bags which present a minimum of pressure drop to a particulate laden fluid stream to be filtered.

The invention claimed is:

1. A fluid filter assembly for removing particulate contaminants from a contaminant laden fluid stream comprising: a sheath filter bag including a pair of longitudinally extending fluid pervious filter panels positioned in spaced opposed relation to form filter bag sides therebetween, said filter bag formed with said opposed spaced filter panels including an open upstream end and a spaced downstream end, said opposed longitudinally extending fluid pervious filter panels being connected together by binder means in strip form with a body portion arranged to extend transversely between said longitudinally extending spaced opposed filter panels and fastened on opposite ends of said body portion to said opposed panels, said strip form body portion being of preselective transverse breadth between opposed filter panels serving to restrain outward inflation of said opposed filter panels of said sheath filter bag so as to provide minimal interference with a fluid stream passing through said filter panels of said filter bag.

2. The fluid filter assembly of claim 1, said strip body portion being fastened to said opposed filter panels by fusion.

3. The fluid filter assembly of claim 1, said strip form including more than one body portion transversely extendible in spaced relation between said opposed filter panels, said body portions decreasing successively in preselected transverse breadth between said spaced opposed filter panels toward said downstream end of said filter bag wherein said spaced opposed filter panels taper inwardly toward said downstream end of said filter bag when inflated.

4. The fluid assembly of claim 3, said body portions of said strip form of said filter bag being formed from more than one continuous longitudinally extending spaced strip form to provide spaced strip members with said opposite ends of each body portion of a strip member fastened to opposed facing filter panels with a pre-selectively sized body portion extending therebetween.

5. The fluid filter assembly of claim 4, said body portions of said spaced strip members of said filter bag being formed from continuous longitudinally extending flexible strip tapes with portions thereof intermittently fastened in staggered, successively linear offset relaxation to spaced opposed facing panels to provide preselectively sized spaced substantially parallel free flexible body portions therebetween.

6. The fluid filter assembly of claim 1, said filter bag longitudinally extending fluid filter panels being fastened along the opposed side edges and downstream edge thereof.

7. The fluid filter assembly of claim 1, at least said filter bag panels being of a preselected fibrous glass filter material.

8. The fluid filter assembly of claim 1, at least said filter bag panels being of a preselected synthetic fibrous material.

9. The fluid filter assembly of claim 1, at least said body portion of said strip form being fastened to said opposed filter panels by sonic fusion.

10. The fluid filter assembly of claim 1, said spaced fluid pervious filter panels longitudinally extending in a range of approximately two (2) inches to forty (40) inches and in width in a range of approximately six (6) inches to thirty-six (36) inches with said body portion transversely extending in a range of approximately six (6) inches to thirty-six (36) inches.

11. The fluid filter assembly of claim 1, said strip body portion advantageously being of fusible material in the range of zero point zero zero five (0.005) to zero point zero eight (0.08) inches thickness and in the range of zero point zero five (0.05) to zero point five (0.5) inches transverse breadth.

12. A fluid filter assembly for removing particulate contaminants from a contaminant laden gas stream comprising: a sheath filter bag including a pair of longitudinally extending fluid pervious filter panels positioned in spaced opposed relation to form filter bag sides therebetween, said filter bag formed with said opposed filter panels including an open upstream end and a spaced downstream end, said spaced opposed longitudinally extending fluid pervious filter panels being connected together by spaced parallel rows of continuous longitudinally extending flexible tapes, each of said tapes being of fusible filter material and including spaced body portions intermittently and sonically fused at opposite body portion ends in staggered, successively linear off set relation to spaced opposed facing panels with corresponding body portions of each strip-like member being in agreement in size and geometry and with said body portions of spaced adjacent tapes decreasing successively in breadth between said opposed filter panels from said upstream end of said filter bag toward said downstream end of said filter bag whereby said spaced opposed filter panels of said sheath filter bag form a filter bag with an overall inwardly tapering shape when inflated by a fluid stream to be treated, the side and downstream edges of said opposed filter panels of said filter bag being sealed by fusion.

13. A method of forming a fluid filter assembly comprising: continuously feeding pre-selectively sized spaced sheets of filter media from a media supply zone; guiding said sheets of filter media in spaced opposed filter panel filter bag forming relation to a fastening zone; continuously feeding at least one preselectively sized strip fastening member between said spaced opposed filter panels; and fastening said strip fastening member to said opposed filter panels to provide at least one transversely extendible body portion therebetween to limit inflation of said filter bag formed by said spaced filter panels; and sealing at least the side edges of said spaced, opposed filter panels of said filter bag.

14. The method of claim 13, wherein said fastening is accomplished by sonic fusion.

15. The method of claim 13, wherein said filter bag side edges and downstream edge are fastened by sonic fusion.

16. The method of claim 13, wherein spaced adjacent strip fastening members in the form of flexible filter tapes are fed between said spaced filter panels and are each fastened to said spaced filter panels to provide a plurality of spaced body portions from each of said tapes, said body portions of each of said adjacent tapes corresponding and being of successively decreasing transverse breadth from the upstream toward the downstream end of said spaced opposed filter bag filter panels.

17. A method of forming a fluid filter assembly comprising: continuously feeding preselectively sized sheets of fusible filter media from spaced supply zones and guiding said filter media sheets in spaced opposed filter panel filter bag forming relation to a fastening zone; continuously feeding a plurality of preselectively spaced tapes of fusible filter material between said spaced, opposed filter panels to said fastening zone; sonically fusing said tapes intermediate said filter panels in longitudinally extending relation to said opposed filter panels to provide a plurality of spaced transversely extending tape body portions, each tape being successively sonically fused to spaced opposed filter panels in successively offset and staggered relation and being preselectively of corresponding and successively decreasing transverse breadth from the upstream toward the downstream end of said spaced opposed filter bag filter panels; sonically sealing at least opposed side edges of said spaced opposed panels of filter bag; and, separating said fluid filter assembly in filter bag form from said continuously fed sheets and sonically fused fastening members.

18. A filter bag forming machine comprising: filter medium support and guide means positioned to feed and guide filter medium from a supply source in filter bag forming spaced opposed filter panels to a fastening means; a tape support means positioned to feed filter fastening tape between opposed inner faces of said filter panels to said fastening means; said fastening means including cooperative anvil and anvil striker means one of which anvil and striker means is positionable intermediate said opposed inner faces and the other of which is cooperatively positionable along the outer faces of said filter panels wherein said anvil and anvil striker means can cooperatively fasten said tape at preselective locations to said opposed inner faces of said spaced filter panels with a body portion extending therebetween to restrain outward inflation of a formed sheath like filter bag which includes said opposed filter panels.

19. The filter bag machine of claim 18, wherein said anvil striker means is sonic.

20. The filter bag forming machine of claim 18, wherein said anvil of said anvil and anvil striker means is positionable intermediate said opposed inner faces and said anvil striker, includes at least two facing spaced anvil strikers positioned along the outer faces of said filter panels.

21. The filter bag forming machine of claim 20, said anvil having a rocker pin and being adjustably rockable on said pin to alternatively move into a first cooperative fastening relation with said tape and a first of said two facing filter panels and a first anvil striker of said anvil striker and to move into a second cooperative fastening relation with said tape to the other of said two spaced facing filter panels and a second anvil striker.

22. The filter bag forming machine of claim 21, wherein said rockable anvil includes two spaced anvil surfaces with a rocking axis therebetween whereby said anvil surfaces can alternatively be pivotally rocked into working relation with one of said two facing filter panels.

23. The filter bag forming machine of claim 22, said spaced anvil surfaces having a preselectively contoured follower surface therebetween so contoured that tape abutting one anvil surface is moved along said follower surface to the opposite anvil surface when said anvil is alternatively rocked.

24. The filter bag forming machine of claim 22, wherein said two spaced anvil surfaces are in the form of freely rotating anvil cylinders.

\* \* \* \* \*